(12) United States Patent
Umbreit

(10) Patent No.: US 7,275,110 B2
(45) Date of Patent: Sep. 25, 2007

(54) AUTHENTICATION USING PORTION OF SOCIAL SECURITY NUMBER

(75) Inventor: Timothy F. Umbreit, Studio City, CA (US)

(73) Assignee: Intercard Payments, Inc., Encino, CA (US)

( * ) Notice: Subject to any disclaimer, the term of this patent is extended or adjusted under 35 U.S.C. 154(b) by 434 days.

(21) Appl. No.: 10/371,246

(22) Filed: Feb. 20, 2003

(65) Prior Publication Data

US 2003/0131102 A1    Jul. 10, 2003

Related U.S. Application Data

(63) Continuation-in-part of application No. 09/455,008, filed on Dec. 3, 1999, now Pat. No. 6,704,787.

(51) Int. Cl.
*G06F 15/16* (2006.01)
(52) U.S. Cl. .......................... 709/229; 726/16; 726/27
(58) Field of Classification Search ................ 709/224, 709/229; 705/18; 726/16, 27
See application file for complete search history.

(56) References Cited

U.S. PATENT DOCUMENTS

| | | | | |
|---|---|---|---|---|
| 5,274,695 | A * | 12/1993 | Green | 379/88.02 |
| 5,311,594 | A * | 5/1994 | Penzias | 713/183 |
| 5,892,470 | A * | 4/1999 | Kusnick | 341/106 |
| 6,021,712 | A * | 2/2000 | Harrop | 100/43 |
| 6,178,510 | B1 * | 1/2001 | O'Connor et al. | 713/201 |
| 6,208,339 | B1 * | 3/2001 | Atlas et al. | 345/780 |
| 6,321,339 | B1 * | 11/2001 | French et al. | 713/201 |
| 6,404,884 | B1 * | 6/2002 | Marwell et al. | 379/265.13 |
| 6,408,094 | B1 * | 6/2002 | Mirzaoff et al. | 382/224 |
| 6,463,416 | B1 * | 10/2002 | Messina | 705/1 |
| 6,507,870 | B1 * | 1/2003 | Yokell et al. | 709/225 |
| 6,539,379 | B1 * | 3/2003 | Vora et al. | 707/6 |
| 6,606,745 | B2 * | 8/2003 | Maggio | 725/23 |

(Continued)

OTHER PUBLICATIONS

AARP Membership Application and Benefits Description, http://www.arrp.org, Nov. 4, 1999.

(Continued)

*Primary Examiner*—Andrew Caldwell
*Assistant Examiner*—Hai V. Nguyen
(74) *Attorney, Agent, or Firm*—McDermott Will & Emery LLP

(57) ABSTRACT

A system and method for an access code issuer to receive an on-line application including certain personal information from a user of a computer network such as the Internet, to independently operatively connect to a database and obtain or verify demographic and additional personal information regarding the user, and issue an access code to the user. The user enters this access code when accessing various nodes or websites of a plurality of affiliated content providers. The content providers obtain or verify the user's demographics by operatively connecting to the access code issuer, thereby obtaining or verifying the demographics of the visitor to its site without requiring the visitor to enter his or her demographic information or to independently provide proof thereof to the content provider. The content provider can then customize the presentation and advertising on its site according to the demographics of the user, and/or can restrict access to its site or portions thereof based on demographics or other information regarding the user. Authentication is provided using a portion of a social security number.

4 Claims, 4 Drawing Sheets

U.S. PATENT DOCUMENTS

| | | | |
|---|---|---|---|
| 6,633,872 B2 * | 10/2003 | Ambrosini et al. | 707/9 |
| 6,715,672 B1 * | 4/2004 | Tetro et al. | 235/380 |
| 2002/0095576 A1 * | 7/2002 | Stoltz et al. | 713/175 |
| 2003/0142800 A1 * | 7/2003 | Paschal et al. | 379/92.02 |
| 2004/0034801 A1 * | 2/2004 | Jaeger | 713/202 |

OTHER PUBLICATIONS

The Adult Check® System, home page http://www.adultcheck.com, (Nov. 4, 1999) and application page (Dec. 4, 1999).

Fagin, Barry, "A Win-Win Way of Filtering the Internet", Denver Rocky Mountain News, Jan. 15, 1999 Denver, CO, USA.

Hellwege, Jean, "Library Internet Filtering Policy Unconstitutional", Court Rules, Trial, Feb. 1, 1999.

"Libraries Under Pressure to Install Internet Filter", Silicon Valley News, http:/www.sjmercury.com/svtech/new/breaking/merc/docs/072712.htm , Dec. 10, 1999.

MacMillan, Robert, "FTC Requires Parental Consent in COPPA Rules", Newsbytes, http://gov.../newspage.shtm?story=October211999FTCRequiresParentalConsentin COPPARule, Oct. 21, 1999.

Schrader, Alvin, "Internet Censorship: Issues for Teacher-Librarians", Emergency Librarian, vol. 26, Issue 5, (ISSN: 1481-1782) May 1, 1999.

* cited by examiner

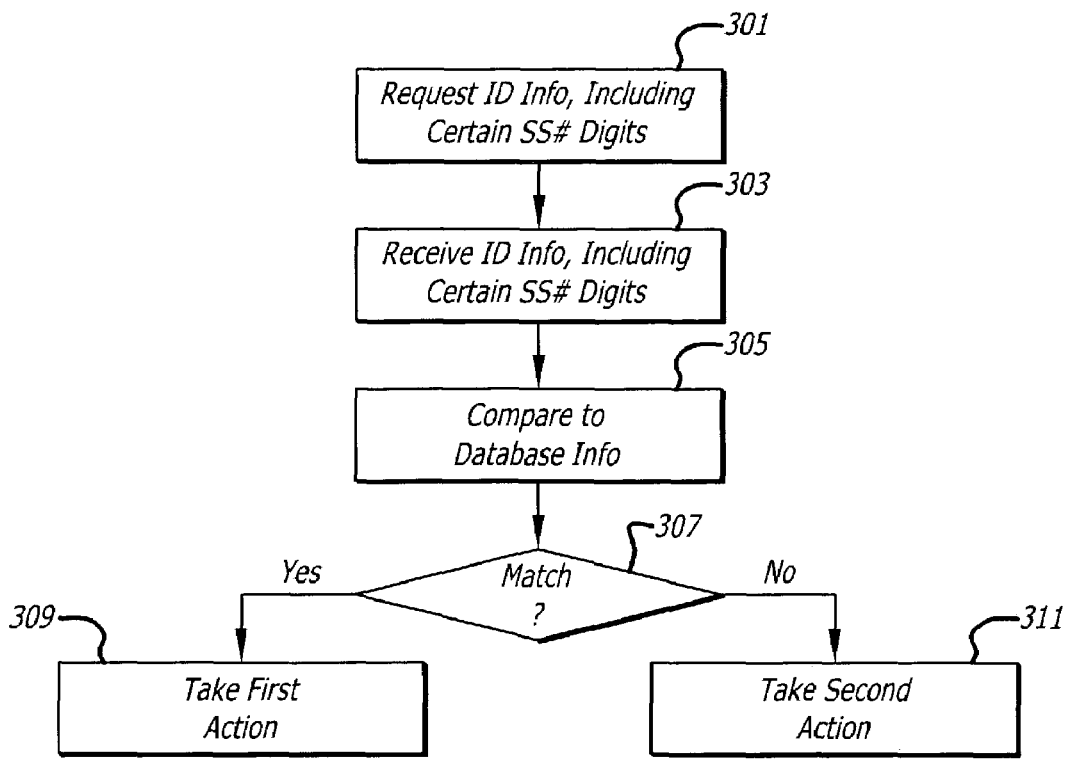
FIG. 3
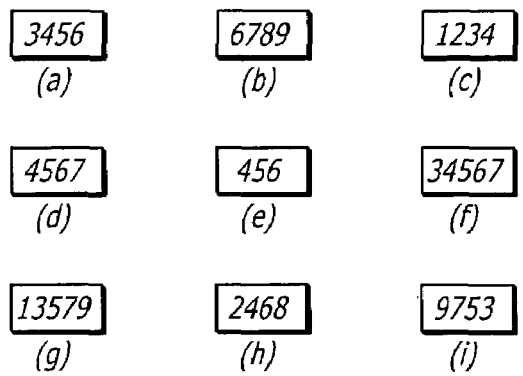
FIG. 4
| 3456 | 6789 | 1234 |
| (a) | (b) | (c) |
| 4567 | 456 | 34567 |
| (d) | (e) | (f) |
| 13579 | 2468 | 9753 |
| (g) | (h) | (i) |
FIG. 5

AUTHENTICATION USING PORTION OF SOCIAL SECURITY NUMBER

CROSS-REFERENCE TO RELATED APPLICATIONS

This is a continuation-in-part of U.S. patent application Ser. No. 09/455,008, filed Dec. 3, 1999, now U.S. Pat. No. 6,704,787 B1, entitled "Authentication System and Method Using Demographic Data" (as amended), the content of which is incorporated herein by reference.

BACKGROUND OF THE INVENTION

1. Field of the Invention

The present invention relates to communications systems and authentication. More particularly, the present invention relates to a system and method for demographically selective distribution of information and entertainment and for user authentication.

2. Description of the Related Art

The Internet has rapidly become a major vehicle for information dispersal, education, entertainment, commerce, and other forms of communication and interaction. A number of websites including portal sites present news, entertainment, shopping opportunities, and other content, with revenue often derived from banner advertising. The advertising presented on such sites i.e., usually broadcast indiscriminately to whomever visits the site, and thus is often of little interest to the web site visitor, and indeed, is often considered to be a nuisance. On the other hand, it is difficult for a variety of reasons to induce people to enter personal information about themselves so that advertising can be customized and targeted.

The Internet also gives rise to jurisdictional complications. Website operators may wish to offer products and services, but at the same time wish to avoid conducting business with persons in certain foreign countries or other jurisdictions, so as to avoid exposing themselves to personal jurisdiction in foreign and unfamiliar courts.

Website operators may wish to restrict the persons who may view and interact with content of their web sites to persons having certain demographic characteristics. Web site operators may also wish to prevent visitors from entering personal information unless those visitors are of specified minimum age, in order to comply with child on-line privacy protection laws. Web site operators may also wish to restrict access to adult entertainment content to those persons eighteen years or older in order to comply with legal restrictions. A number of adult verification services exist for providing personal identification numbers which can be used to access adult entertainment sites. However, those services are believed to rely upon the existence of a credit card in order to determine whether someone qualifies for access to such sites. Because some credit card issuers issue credit cards to minors, those services do not actually verify a person's age.

Various attempts have also been made to prevent children from accessing inappropriate content, particularly from Internet terminals installed in public libraries. Filtering software is available, but such software is prone to filtering out either too much or too little content, or both at the same time. At least one court has struck down as unconstitutional a county policy requiring libraries to install filtering software.

Chat groups and other forums exist on the Internet for the interchange of ideas between and among website visitors. Like any other communication, sometimes it is desirable to restrict discussions to only certain persons or certain groups of people.

Another issue that faces users of electronic systems, such as the Internet, is user authentication. For both the protection of the user and merchants and other entities engaging in transactions or communications with the user, it is often necessary to authenticate the user, meaning to verify that the user is the individual that the user purports to be.

One of the problems and difficulties with user identification has been the proliferation of identification information about users. This has made it easier for the identity of a user to be misappropriated.

For this very same reason, users are often hesitant to provide the most confidential classes of identifying information, such as their social security numbers.

SUMMARY OF THE INVENTION

The invention is an authentication process and system for authenticating an individual having a social security number.

In one embodiment of the invention, a request is electronically communicated to the individual to enter information into a computer about the individual. The request seeks certain specified digits of the individual's social security number. The certain specified digits, however, are fewer than all of the digits of the individual's social security number.

The identification information about the individual that the individual enters into the computer is received, including the certain specified digits of the individual's social security number. A comparison is made between the identification information entered by the individual, including the certain specified digits of the individual's social security number, with a database containing the identification information about numerous persons. The database includes at least the certain specified digits of each person's respective social security number.

A determination is made whether there is a match between the identification information entered by the individual, including the certain specified digits of the individual's social security number, with the database containing identification information about numerous persons. If there is a match, a first action is taken. If there is not a match, a second action is taken.

In one embodiment, the foregoing process is part of a transaction with an entity. In this embodiment, the information in the database may not have been gathered or provided by the entity.

In a still further embodiment, the entity communicates the identification information received from the individual, including the certain specified digits, to a third party that is separate and distinct from the entity. The comparing and determining steps are also not performed by the entity.

In a still further embodiment, an attempt is first made to authenticate the individual with identifying information supplied by the individual that does not include the certain specified digits. In this embodiment, the information that is initially supplied by the individual that does not include the certain specified digits is compared with the database containing identifying information about numerous persons. If the comparison fails to yield a match, a further request is made to the individual for the certain specified digits of the individual's social security number, and the process repeats, but using the certain specified digits in the comparison and determination steps.

In one embodiment, the failure to obtain a match is due to certain portions of the identification information not matching. In another embodiment, the failure is due to the identification information matching more than one record of information.

In one embodiment, the certain specified digits received from the individual are in the same order as they appear in the social security number. In another embodiment, they are not in the same order.

In one embodiment, the certain specified digits are consecutive digits in the social security number. In one embodiment, the consecutive digits include the first digit of the social security number; in another embodiment, the consecutive digits include the last digit of the social security number; and in a still further embodiment, the consecutive digits do not include either the first or the last digits in the social security number.

In one embodiment, the certain specified digits are four in number.

In a still further embodiment, the certain specified digits are not consecutive digits in the social security number.

In one embodiment, the first action includes providing age information about the individual. In another embodiment, the first action includes granting the individual electronic access to material.

In a still further embodiment, the second action includes communicating the absence of a match.

In a still further embodiment, the second action includes denying the individual electronic access to material.

The invention also includes a broad variety of equipment to implement the processes of the invention.

In one embodiment, a communication system is provided that electronically communicates to the individual a request to enter the identifying information about the individual, including certain specified digits of the individual's social security number, the certain specified digits being fewer than all of the digits of the individual's social security number.

A receiving system is provided for receiving the individual identification information about the individual that the individual entered into the computer, including the certain specified digits of the individual's social security number.

A comparison system compares the identification information entered by the individual, including the certain specified digits of the individual's social security number, with a database containing identification information about numerous persons, including at least the certain specified digits of each person's respective social security number.

A determination system determines whether there is a match between the identification information entered by the individual, including the certain specified digits of the individual's social security number, with the database containing identification information about numerous persons.

An action-taking system takes a first action if there is a match and a second action if there is not a match.

In one embodiment, a transaction system is also included for facilitating the entry into a transaction between the individual and an entity. In this embodiment, the information in the database may not have been gathered by or provided by the entity. In one embodiment, the transaction system communicates the identification information received from the individual, including the certain specified digits, to a third party that is separate and distinct from the entity. In this embodiment, the comparison and determination systems may not be operated or controlled by the entity.

The systems of the invention are also configured to implement all of the processes of the invention, as set forth above.

The above-described objects of the present invention and other features and benefits of the present invention will become clear to those skilled in the art when read in conjunction with the following detailed description of a preferred illustrative embodiment and viewed in conjunction with the attached drawings in which like numbers refer to like parts, and the appended claims.

BRIEF DESCRIPTION OF THE DRAWINGS

FIG. 3 illustrates the process of one embodiment of the invention.

FIG. 4 sets forth one embodiment of the invention using a fictitious social security number.

FIGS. 5(a)-(i) set forth various examples of entries that an individual would make in response to various requests for certain specified digits of the individual's social security number.

DETAILED DESCRIPTION OF ILLUSTRATIVE EMBODIMENTS

Figure 1:
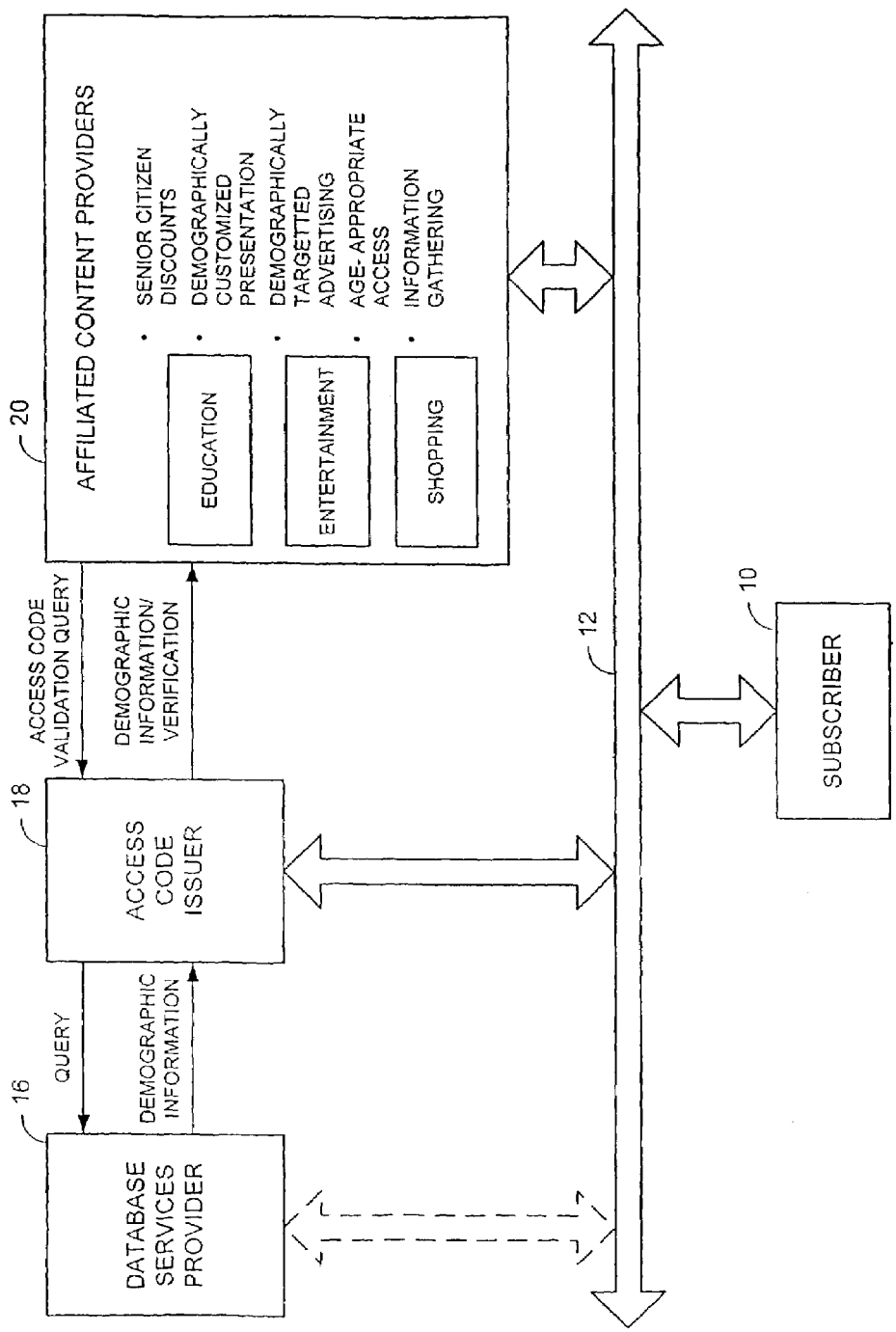
FIG. 1 is a system diagram of one embodiment of the invention.

FIG. 1 is a system diagram. A user or potential subscriber 10 at one node establishes contact with an access code issuer 18 at another node via anyone of known communication devices including a computer network such as Internet 12. Subscriber 10 fills out an application which may include an on-line application. The on-line application includes personal information such as name, geographic information including the subscriber's address, and possibly other contact information such as a telephone number, fax number, and an electronic mail address. If the subscriber must purchase a subscription in order to gain access to various content, the on-line application could include additionally a credit card number and type, and an expiration date and billing address associated with the credit card. In such a case, access code issuer 18 checks the validity of the credit card information, usually by contacting the credit card issuer via known methods, and also preferably evaluates whether the e-mail address is a valid e-mail address. An invalid e-mail address or an e-mail address having historically suspect domains may be one indication that the credit card number is stolen, being misused, or will otherwise result in a charge back to the merchant.

After receiving the on-line application, access code issuer 18 operatively connects to a database such as provided by a database services provider 16: The database includes demographic and/or other information regarding a plurality of persons. Because such databases are usually quite large, the database will typically though not necessarily be maintained by a third party such as a consumer information or consumer credit database compiler, and be maintained offsite from the access code issuer. The consumer information database may be compiled from various records including consumer credit records. One such provider of database services is Choicepoint of Alpharetta, Ga. Communication with the database services provider can be a real time connection such as a local area network (LAN), a wide area network (WAN) such as the Internet, a telephone line including ISDN, T1, or OC-12, wireless communication, or combinations of the above. Access to such a database may be purchased. Real time access to the master database may be obtained via electronic communication by purchasing a subscription. Alternatively, the database provider may provide to the access code issuer a copy of the database so that the access code issuer can maintain a local copy. The copy may be transmitted via either electronic communication or via mass storage such as a magnetic type physically transported. In such a case, both the original compiler and vendor of the database, as well as in-house hardware and personnel, would constitute providers of records services. In a preferred embodiment the connection is a real time Internet connection with database provider 16. In this embodiment, the access code issuer 18 establishes with database provider 16 a connection known as a socket via Internet transmission control protocol (TCP). Once the socket is opened, handshaking is performed to exchange login, encryption, and other information in a manner well known to those within the computer networking arts. Database provider 16 may establish its own universal message format (VMS) or other protocol for such connections, in which case access code issuer 18 interfaces to the database using the appropriately customized interface.

Figure 2:
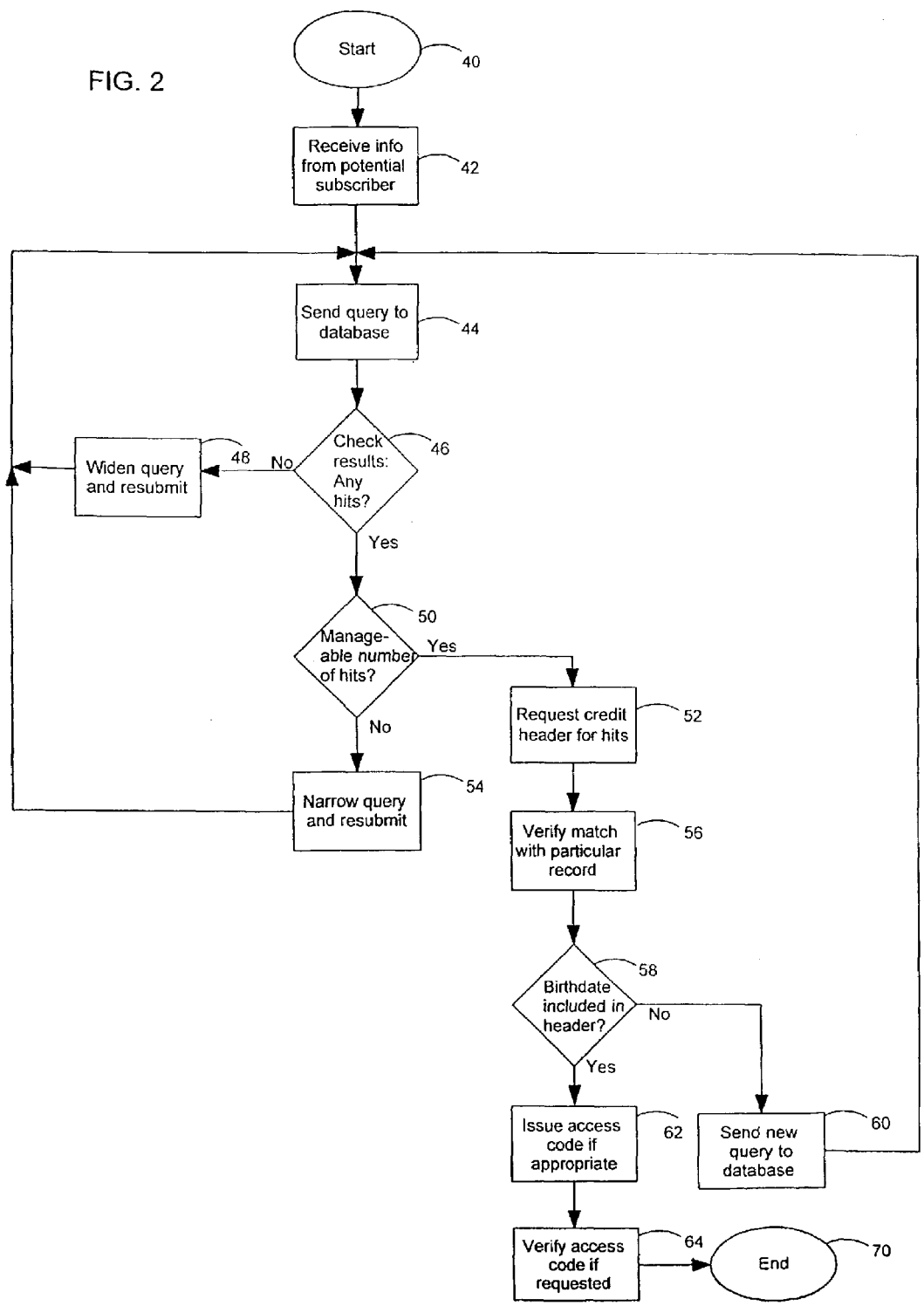
FIG. 2 is a flow diagram for obtaining demographic information from a database.

FIG. 2 is a flow diagram for obtaining demographic information from a database. Access code issuer 18 receives information from a potential subscriber 42 and then formulates and sends a query to the database 44, regardless of whether the database is provided onsite or offsite. The query to the database typically includes a name and geographic information such as a current address of the user, as provided by the user. The database responds to the query by providing one of several types of responses. The database may respond by providing demographic information for all hit records; the database may provide a cardinal number of the hits obtained especially if more than one hit was obtained; or the database may respond that no hits were obtained. Upon checking the results from the database query 46, if no hits from the database are obtained, the query may be widened and resubmitted to the database 48. For example, the next query could use only the zip code from the address obtained from the user as query criteria. On the other hand, if at least one hit is found, the system determines whether a predetermined, manageable number of hits was received 50. However, if too many hits are obtained, the query can be narrowed and resubmitted with additional information about the user 54. If necessary, this additional information can be obtained from the user by asking the user to provide the additional information.

Once a sufficiently small number of hits is obtained, ideally one hit, the access code issuer 18 requests that the database send a credit header for all of the hits 52. Next the access code issuer 18 verifies that the potential subscriber corresponds to a particular record within the database 56. Typically this is accomplished by verifying that the name and address provided by the potential subscriber matches the name and address within the database, or at least is close enough to determine that the record matches the potential subscriber. Once it is determined that the record within the database matches the potential subscriber 56, the demographic or other desired information is examined, and an appropriate access code is generated and issued to the potential subscriber if appropriate 62. In the case of a multi-purpose access code, the access code is associated with one or more demographic characteristics or other desired information. The demographic information may be either encoded within the access code itself, or may be stored at a location that is accessible to the access code issuer 18 and preferably on-site to the access code issuer so that the access code issuer 18 can forward that information to a content provider for verification if requested 64.

Access codes may be restricted in several situations. In the case of a limited purpose access code such as a senior citizen access code or adult access code, the access code will be issued only: if the potential subscriber's age qualifies as a at least the minimum age. Specifically, if the access code is a limited purpose access code to be used for the purpose of receiving a senior citizen discount, or accessing content that may be harmful to minors, the demographic information retrieved must include chronological information such as a date of birth 58, and an access code is issued only to persons of the appropriate age. The determination of whether to issue such an access code is based on a comparison of the persons' respective dates of birth and the current date. An access code may also be issued only if other criteria are met. For example, an access code may be issued only to persons who are resident within the United States, to ensure that content providers provide access only to U.S. residents, thereby reducing the content provider's risk of being subject to personal jurisdiction and being haled into a foreign court based upon its contacts with' citizens of that foreign country. Due to the content and structure of the database being accessed, the desired geographic information may be not be available from the hit record. However, the database may contain additional information such as one or more previous addresses for the potential subscriber. In that case, a new query 60 may be formulated and submitted using, for example, the previous address or addresses. If a second hit is obtained using that previous address, and it is determined that the potential subscriber matches the record associated with the new query 56 including the previous address, then any demographic information which is available from that second record but is not available from the first record may be thus obtained and associated with the access code. For example, a date of birth 58 may not be available within the first record which is matched with the user's present address. However, a second address may be available within the database for that user containing at least one of the previous addresses and the birth date as well. In this way, the birth date can be obtained even if the first record based upon the user's present address does not contain a date of birth. When access code issuer 18 is satisfied that it has identified the user within the database 56 and has obtained the desired information from the database, access code issuer 18 closes the socket to database provider 16.

Preferably, the access code is generated 62 and sent to the user in real time, such as across the Internet in the same on-line communication session as the one in which the user requests the access code. Alternatively, the access code can be transmitted to the user at a later time or via an alternative communication means, such as via an e-mail message. Such delayed communication of the access code may be necessary where it is not possible to obtain or to verify the demographic information, or to verify the credit card or other billing arrangements for the subscription which the potential subscriber is requesting. The access code can be a personal identification number, a personal account number, a password, or other, known types of access codes, either alone or in combinations.

The access code may be granted to any user who requests one, or may be granted only to persons for whom a minimum amount of demographic information can be obtained and/or verified. Still further, the access codes may be granted only to persons who meet certain criteria, such as being senior citizens, or living within a particular geographic area, or meeting other minimum age requirements such as 18 years old. When the access code is granted only to persons meeting specified criteria, then the verification process 64 can consist merely of access code issuer 18 verifying that the access code is a current and valid access code, in response to a query initiated by content provider 20, or via a periodic update of a list of valid access codes provided to content provider 20. Where the access code provider merely provides a "yes" or "no" validation of the access code, the information regarding the demographics of the access code holder is transmitted to content provider 20 by merely informing content provider 20 of the requirements for obtaining an access code, e.g., that the user be 18 or older, along with being a current paid subscriber. The access code could also be granted only to persons of lower than a maximum age, or within a specified age range. Such an access code may be used for marketing purposes and attracting visitors where it is perceived that people may wish to visit websites particularly because primarily people within a certain age range and/or a particular gender will be allowed to browse and/or post messages.

The access codes may also be multi-tiered. A first type of multi-tiered access code would be an access code in which people holding an access code that represents a higher level of access are granted access to all of the content at the site. An access code associated with a lower level of access would grant the user access to only certain portions of the site. Such a multi-tiered access may be desirable where access is paid for, and/or where access is granted on an age-appropriate basis. The access codes may also be horizontally multi-tiered. In a horizontally multi-tiered access arrangement, content providers 20 would provide different content to different visitors based upon the demographic or other personal information associated with the holder of that access code. Advertisers at the site may wish to provide different advertising banner content based upon the users' level of education, gender, age, marital status, or other personal information. For example, a news site may wish to provide different news stories to persons based upon their respective personal information such as level of education, age or gender.

The access code issuer 18 need not necessarily be a single entity. Different access code issuers and verifiers could exist, although a single access code verifier or verification method may be preferred for reasons of speed and convenience.

The network of service providers or content providers 20 affiliated with the access code issuer 18 provides access to a variety of information, entertainment, and other services via the computer network such as Internet 12. Content providers 20 reside at respective nodes on the network. The affiliated content providers 20 may provide educational content; entertainment content including textual, video, and music content; news content including financial and sporting news; on-line shopping including offers for a variety of goods and services; and various other types of content and computer-based services provided by websites. The content providers may provide senior citizen discounts, or may provide access to sexually explicit adult entertainment materials only to those of age 18 or older. A content provider 20 may also provide educational information on an age-appropriate basis, such as reproductive-related health information that is written for the age level of the particular minor visitor to the site. The content providers may also provide demographically customized presentations, such as a clothing manufacturer who presents most prominently clothing that is most likely to be of interest to a visitor of the gender, age, income, and geographic residence of the user. The advertising may also be demographically targeted, such as an automobile pop up banner add which features an automobile that is more likely to be of interest to the user based upon his or her demographics. The access code can also be used for information gathering posed by the content providers. A content provider may wish to know what type of person is visiting its site, ordering its products or services, not ordering its products or services, or spending how much time viewing specified portions of its site. The present invention allows the content providers to obtain and track this information, and to customize its presentation and advertising without unnecessarily burdening the visitor to its site by requesting the subscriber to enter such information at the site. Subscribers may naturally find that entering such information would be burdensome, and may also be naturally reluctant to provide such personal information.

When a user or subscriber 10 contacts a content provider 20 such as via the world wide web, content provider 20 may ask user 10 to provide an access code, either upon the user entering the site or anytime thereafter such as when the user indicates that he or she wishes to make a purchase or to enter a restricted portion of the content provider's web site, or to post a message. The user is prompted to enter his or her access code. Preferably, content provider 20 authenticates and verifies the validity and level of access associated therewith by contacting access code issuer 18, or equivalently by contacting an entity which maintains a list of valid access codes and in one form or another the demographics and levels of access associated with the access codes. The authentication and verification preferably is done in real time via an electronic connection to access code issuer 18, such as via Internet 12, telephony, or any of other well known means of electronic communication. In one embodiment, content provider 20 transmits the received access code to access code issuer 18, and access code issuer 18 responds by indicating that the access code is valid. This would be the case where the access code represents merely "yes" or "no" type of access. In another embodiment, the access code issuer responds by transmitting at least a subset of the actual demographic information associated with the access code bolder, such as that the user to whom the access code was issued is a 42-year-old female who lives in Cleveland and who recently financed the purchase of a new vehicle. The access code issuer could even transmit to content provider 20 a list of web sites that user 10 has visited using her access code, as well as a list of on-line purchases which user 10 has made, provided that other content providers provide such feedback to access code issuer 18.

Once content provider 20 has been apprised of whether the access code is valid and/or the actual demographics or other information regarding user 10, content provider 20 can provide or not provide the requested content to the user. If the visitor is a senior citizen, the content provider may now provide a downloaded or streaming video motion picture across the Internet at a discount, just as if the user were showing his or her driver's license at a theater box office in order to obtain the discount. The content provider may allow access to an adults-only portion of its website based on proof, provided by access code issuer 18, that the visitor truly has a date of birth that makes the user 18 years of age or older, rather than that the visitor merely holds a credit card. The content provider may edit the content of its site so that certain material is not made available to visitors within a state or country in which merely displaying the content would violate local law. The content provider may sell advertising such as banner website advertising based on the actual demographics of the visitor to whom the advertising will be displayed.

A variety of incentives exist or could be provided for encouraging a user to obtain and use such an access code. An access code could be required in order to access a site, or in order to access certain restricted content within the site. Promotional offers or discounts could also be provided to subscribers who enter an access code upon entering a site.

Additionally, users would have a natural incentive to obtain and use such a code, so that website content, promotions, and advertisements could be presented which would more likely be of interest to the user than if no information about the user were known. Additional incentives to obtain and use an access code could be formulated and promoted, and will be obvious to those skilled within the marketing arts. Some users may be reluctant to obtain and use such an access code due to apprehension that access code issuer 18 will reveal the user's identity to content providers 20, or to other persons or entities. Such a reluctance may be overcome in part by guaranteeing to users that only their demographic information or specified portions thereof will be revealed, and not their identities. When user 10 first signs up for an access code or at any time thereafter, access code issuer 18 could also allow user 10 to specify which demographic information may be revealed to content providers 20, and which demographic or other personal information will not be revealed.

FIG. 3 illustrates the process of one embodiment of the invention. As shown in FIG. 3, identifying information is requested from an individual, as shown in the Request ID Info, Including Certain SS # Digits step 301. During this step, a request is typically communicated electronically to an individual for identification information.

The exact types of identification information will vary from application to application. In many applications, the individual's name will be requested. In some applications, the address, driver's license number, birth date, age, as well as other types of information, may also be requested.

Of particular importance to this embodiment of the invention is that a request is also made for certain specified digits of the individual's social security number. Significantly, the certain specified digits are fewer than all of the digits of the individual's social security number. Asking for only a portion of the digits reduces the hesitancy of individuals to provide their social security numbers because the portion alone has little utility, while, as will be seen below, still provides a powerful means for assisting in the authentication process.

In its broadest aspects, the invention embraces all computer topologies, such as the topologies discussed in connection with FIGS. 1 and 2. The individual may enter the requested identification information into a computer that the individual owns, or into a computer that is owned by someone else. That computer may be as simple as a dumb terminal, a PC, or other type of general or dedicated computing device. In one embodiment, the computer is connected to a network, which, in one embodiment, is the Internet.

There are a broad variety of reasons as to why a computer system would wish to authenticate an individual, and all such reasons are embraced by certain embodiments of the invention. These reasons include individual authentication for the purpose of completing a transaction, such as a transaction to grant the user access to information or a transaction in which the user purchases a product or service. Authentication may also be used as a precursor to registering the user, or for any other purpose.

The receiving step 303 that has been described in FIG. 3 can also be implemented in a broad variety of ways. For example, the information can be received by the entity that made the request 301, such as a merchant seeking to complete a transaction with the individual, or it can be received by a third party that is separate and distinct from both the individual and the party that sent the request, as will be explained further below.

FIG. 4 sets forth a fictitious social security number, while FIGS. 5(*a*)-(*i*) set forth various examples of entries that an individual would make in response to various requests for certain specified digits of the individual's social security number, the certain specified digits being fewer than all of the digits of the individual's social security number.

FIG. 5(*a*), for example, illustrates the entry that would be made if the request were for the third through sixth digits; FIG. 5(*b*) represents the entry that would be made if the request were for the sixth through ninth digits; FIG. 5(*c*) illustrates the entry that would be made if the request were for the first through fourth digits; FIG. 5(*d*) illustrates the entry that would be made if the request were for the fourth through seventh digits; FIG. 5(*e*) illustrates the entry that would be made if the request were for the fourth through sixth digits; FIG. 5(*f*) illustrates the entry that would be made if the request were for the third through seventh digits; FIG. 5(*g*) illustrates the entry that would be made if the request were for the first, third, fifth, and seventh digits; FIG. 5(*h*) illustrates the entry that would be made if the request were for the second, fourth, sixth, and eighth digits; and FIG. 5(*i*) illustrates the entry that would be made if the request were for the ninth, seventh, fifth and third digits, in that order.

As can be seen from the various illustrations in FIG. 5, and the discussion above, there can be wide variation in the request for certain specified digits of the individual's social security number, the certain specified digits being fewer than all of the digits of the individual's social security number. As suggested by these illustrations, the request can be for consecutive digits, can be for digits that are not consecutive, can be for sequential digits, can be for digits that are not sequential, can be for digits that include the first or last digit, or can be for digits that do not include the first or last digit. The common thread is that the request is for certain specified digits of the individual's social security number, the certain specified digits being fewer than all of the digits of the individual's social security number.

Although the social security number is illustrated in FIG. 4 as having nine digits, it is, of course, to be understood that the invention is equally applicable to social security numbers of a different length, should such a different length become in use. The invention is equally applicable to the partial entry of other identification strings that uniquely identify an individual, such as the individual's employee number, bank account number, or credit card number, in lieu of or in addition to the social security number.

Referring again to FIG. 3, the digits entered by the individual in response to the request, such as one of the entries illustrated in FIGS. 5(*a*)-(*i*), are received, as illustrated in a Receive ID Info, Including Certain SS # Digits step 303.

The received digits are then compared to information in a database, as reflected by a Compare to Database Info step 305. The invention embraces all of the various forms, locations and techniques for implementing the database comparison step 305.

The database itself contains information about numerous individuals, information that preferably contains the same fields of information that are being requested from the individual, or at least a significant subset of this requested information. The database should also contain corresponding social security numbers of individuals, or at least the certain digits that were specified in the request. If an identification string other than a social security number were being used, then the database would instead need to contain the other identification strings that correspond to the individuals in the database, or at least the certain characters that were specified in the request.

Although spoken of as a "database," it should, of course, be understood that the database could embrace numerous information sources, of different types, in different locations, under different management and control, and with different schemas. Both a "single" database and collection of such disparate databases are referred to herein as simply a "database." As indicated, however, it is to be understood that, in reality, the "database" may, in fact, consist of several databases of different types in different locations under different management and control, all being consulted simultaneously, consecutively, and/or only in certain instances or in connection with certain situations.

In one embodiment of the invention, the information in the database is not gathered by or provided by the entity that makes the request to the individual for the identification information. Rather, the information in the database in this embodiment is gathered or maintained by a third party, such as a provider of verification services. The data could instead or in addition come from public records, such as records of the Department of Motor Vehicles, other government databases, or other publicly-accessible private databases.

In this embodiment of the invention, the comparison step 305 is also preferably not performed by the entity communicating the request for the identification information to the individual. For example, the entity delivering the request could be a merchant website at which the individual seeks to gain access or to purchase a product or service. The merchant website requests the identification information from the individual; the identification is furnished by the individual; and the identification information is then delivered to a third party that the merchant website employs for the purpose of assisting the merchant website in authenticating the user. In this embodiment, the individual identification information could be sent directly to the third party, thus entirely bypassing the merchant website.

In a still further embodiment, the merchant website might not itself request the identification information from the individual, but, instead, might direct the individual to another website at which the identification information would be sought and processed.

In a still further embodiment, the identification information could be delivered to an electronic credit card processing service that uses the information to authenticate the user and thus to communicate to the merchant website that the purchase transaction is authorized. Indeed, in certain embodiments of the invention, the credit card transaction website might itself communicate the identifying information about the individual to a still further entity which would then proceed with the authentication process.

Regardless of which entity is performing the comparison step 305, the next related step is to determine whether there is a match between the identification information entered by the individual, including the certain specified digits of the individual's social security number, with the database containing identification information about numerous persons, as reflected in a match step 307.

The technology of matching database information is well developed and well known, and all such techniques are embraced by the invention, as well as all techniques that are later discovered. By way of example only, the match could be based upon a determination of equality (or substantial similarity) between the fields of information provided by the individual in response to the request for identification information and a record in the database. In some embodiments, only certain fields of information could be compared. In still further embodiments, various waiting criteria can be employed to determine whether there is sufficient similarity to declare a match.

If a match is found, a first action is taken, as reflected by a Take First Action step 309.

The invention embraces all different types of actions that could be taken at this stage of the process. By way of example only, one type of action would be to grant the individual access to certain material on the website he is visiting. Another type of action could be to confirm the allowability of a purchase transaction. A still further type of activity could be to register the individual. Of course, it is to be understood that the match determination would be communicated. If a determination were being made by an entity other than the one that requested the identifying information from the individual, the communication could be made to that entity. It could also be made to the individual. If a credit card processing system were involved, and if the match were being done by an entity other than the credit card processor, the communication could also be directed to the credit card processor who, in turn, would communicate to the merchant website that the transaction is authorized. In a still further embodiment, further information could be returned as part of the first action. For example, information in the database (or in a related database) about the age or income of the individual could be returned.

On the other hand, if a match is not found in the Match? step 307, a second action is taken, as reflected by a Take Second Action step 311. Again, the invention embraces all types of second actions that might be taken. By way of example only, the second action might be to communicate an inability to authenticate the individual. In one embodiment, the individual might be given an opportunity to review the identifying information that the individual has provided to determine if a mistake was made, to correct the entry, and to have the process repeated.

In a still further embodiment, the second action 311 could include granting the individual access to different material.

In a still further embodiment, the second action 311 could include referring the individual to a different merchant or website, thus providing the referring merchant or website with an opportunity to generate referral fees from an individual that the referring merchant or website is unable to authenticate.

In a still further embodiment, the second action 311 could be to record the information about the lack of a match in a database, including, in certain embodiments, some or all of the information provided by the individual, and, in certain embodiments, sell that database information to another entity.

In a still further embodiment, the second action 311 could be to analyze the reason for the lack of match and, depending on the reason, direct the individual to another entity or website or direct another entity or communication system to the individual.

Although asking an individual for a portion of the individual for a portion of the individual's social security number will meet with less resistance than asking the individual for the individual's entire social security number, even asking for a portion may meet with some resistance. Further, there are many situations in which not even the portion of the social security number is needed for accurate authentication.

Figure 6:
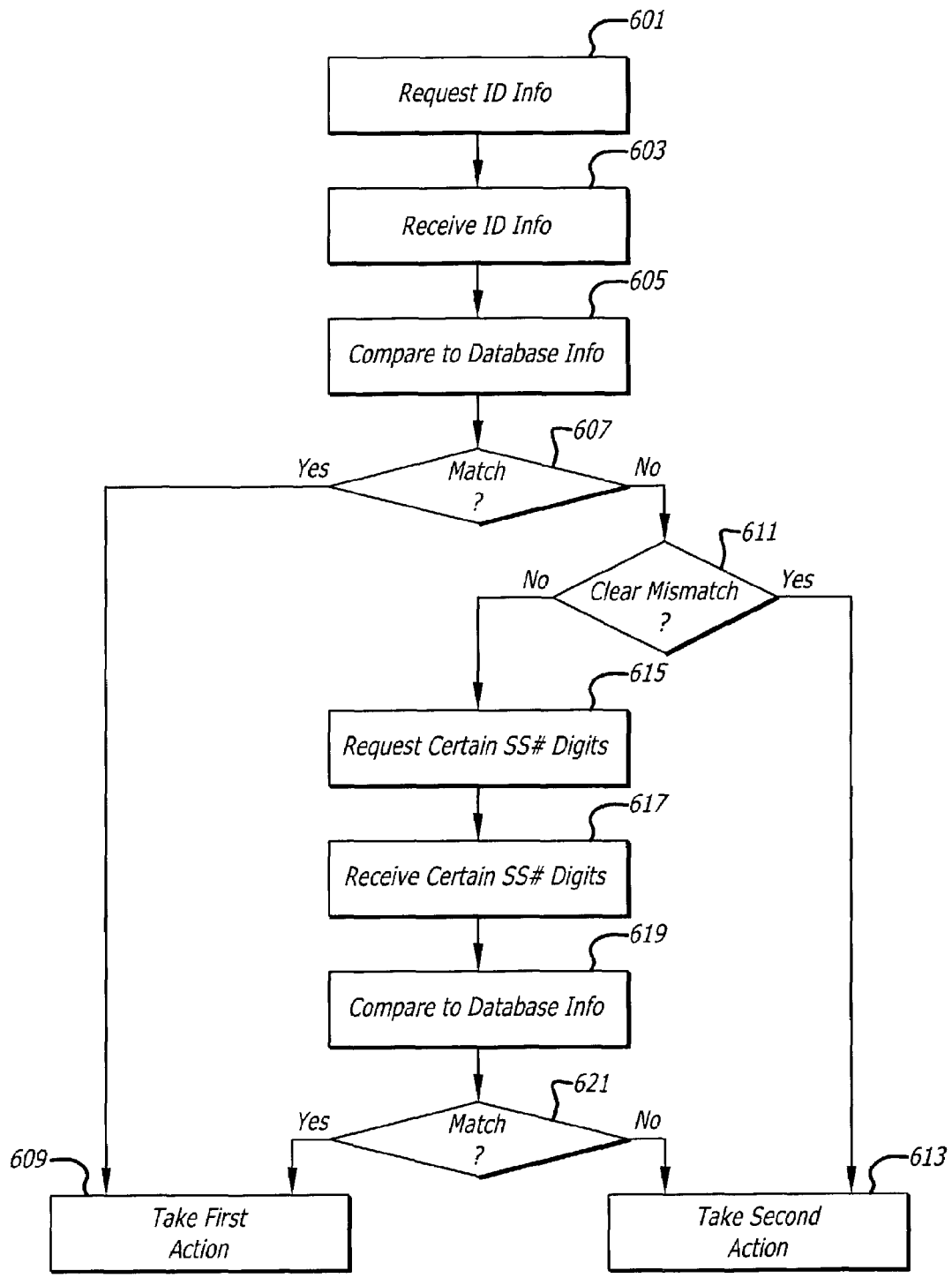
FIG. 6 illustrates another embodiment of the invention that seeks a portion of an individual's social security number only when necessary.

FIG. 6 illustrates another embodiment of the invention that seeks a portion of an individual's social security number only when necessary.

As shown in FIG. 6, identification information is requested from the individual, as reflected by a Request ID Info step 601. This request is the same as the request discussed above and illustrate in FIG. 3 as request 301, except that no portion of the individual's social security number is initially sought.

The identifying information supplied by the individual is then received, as reflected by a Receive ID Info step 603. This is again the same as was discussed above in connection with the Receive ID Info step 303 but, again, no portion of a social security number is involved.

The identifying information is then compared to information in the database, as reflected by a Compare To Database Info step 605. Again, this involves all of the same considerations that were discussed above in connection with the compare step 305, except, again, no portion of a social security is involved.

A similar, related determination is then made as to whether there is a match between the identification information supplied by the user (or a portion thereof) and the information in the database, as reflected in the Match step 607. If there is a good match, the process proceeds to take the first action, as reflected in a Take First Action step 609, governed by the same considerations as were discussed above in connection with the First Action step 309 in FIG. 3.

On the other hand, if a satisfactory match is not found, a further determination is made as to whether the mismatch is very clear, as reflected by a Clear Mismatch? step 611. In some situations, the information that is compared might match several records in the database, creating an ambiguity, but not necessarily a determination that the individual's authenticity is lacking. There could also be minor mismatches, such as a minor variation in an address or, perhaps, the presence of a middle initial in one record, but not the other. Again, the results of such a comparison do not clearly indicate that the authenticity of the individual is lacking.

Of course, there might be a clear mismatch, such as an exact match between the name and address, but a substantial mismatch between birth dates. In this situation, the system might be pre-programmed to determine that the degree of the mismatch is sufficient to warrant a conclusion that the individual is not to be authenticated, in which event the process would proceed to taking the second action, as reflected by a Take Second Action step 613. The second action would track the possibilities and permutations discussed above in connection with the second action 311 in FIG. 3.

If it is not clear that there is a mismatch, the process would proceed to request certain specified digits of the individual's social security number, as reflected by a Request Certain SS # Digits step 615; receive those digits, as reflected by a Receive Certain SS # Digits step 617; compare those digits, along with some or all of the original identification information with the database, as reflected by a Compare To Database Info step 619; and again determine whether a match is present, as reflected by a Match? step 621. If a match is present, the first action would be taken, as reflected by the Take First Action step 609. If a match is not present, the second action would be taken, as reflected by the Take Second Action step 613.

In essence, the process set forth in FIG. 6 is the same as the process set forth in FIG. 3 and is governed by the same considerations and variations that are discussed in connection with FIG. 3, except that no digits of the social security number are originally requested. Instead, the digits are only requested if a satisfactory match is not initially found and if there appears to be a likelihood that a satisfactory match could be found with the additional information. Of course, the determination as to whether there is a clear mismatch, as reflected in the Clear Mismatch? step 611, is an optional step. The system could be configured to always seek the certain specified digits of the social security number whenever a match is not found, following the Match? step 607. In this instance, a "No" decision emanating from the Match? step 607 would flow directly to the Request Certain SS # Digits step 615, and the Clear Mismatch? step 611 would not be part of the flow diagram.

As should be readily apparent to the skilled artisan, a broad variety of hardware and software can easily be adapted to implement the various embodiments of the invention. For example, a communication system, such as a computer network, an example of which is the Internet, can readily be adapted to communicate the request to the individual for the identification information, including the specified digits of the individual's social security number. A receiving system, such as a client PC, a dedicated client device, a web server, or other type of computer system, could be used to receive the identification information from the individual, including the certain specified digits of the individual's social security number. A comparing and determining system, such as a database management system running in a computing system, could be used to compare the identification information provided by the individual with information in the database and to determine whether there is a match. As previously indicated, the database could, in fact, be numerous different information sources, at different locations, under different management and control, and with different schemas. In this instance, the database management system might, of course, need to issue multiple queries and coordinate, integrate and analyze the data that is received. The database management would implement one or more of the many existing or hereinafter discovered technologies that are used to identify matching records, including technologies that determine matches based on similarities that are less than exact.

An action-taking system can also be used to take the first action if there is a match and the second act if there is not a match. The exact nature and location of this system, of course, would vary markedly depending upon the natures of the actions that are taken. The action-taking system could be part of the database management system, and could be as simple as a report from the system as to whether a match was or was not found. It could be part of a credit card processing system and be the delivery of a charge authorization or denial. It could also be a mechanism on a website that grants access to certain materials upon a match being reported or, conversely, denies access to those materials upon a failure to match being reported. The action-taking system could be any one of these items, or more than one of these items in combination.

In some embodiments of the invention, the authentication process of the invention will be a part of a larger transaction process for facilitating the entry into a transaction between the individual and an entity, such as a purchase transaction. In this embodiment, a transaction system may be utilized to manage the flow of information, as well as, in certain embodiments, to store and report on the results of the transaction.

It is, of course, to be understood that the communication system, receiving system, comparing system, determination system, action-taking system and transaction system may, in some embodiments, not be managed by a single entity. To the contrary, these components may be operated and managed by entities other than the entity with whom the individual seeks to communicate and, in some embodiments, conduct a transaction with. Indeed, the components of the invention may, in certain embodiments, be separately managed by several entities. In this situation, of course, appropriate communication technology would be used to facilitate the necessary communications between the various entities and their associated equipment. As is well known, the Internet is a prime system to facilitate such communication, among others.

In still further embodiments, enhanced degrees of reliability can be obtained when the information that is examined in the database is not gathered or provided by the entity with whom the individual wishes to communicate, to receive services from, or to enter into a transaction with. Rather, the database preferably consists of information that is developed wholly independent of the entity that is seeking to authenticate the individual. Such independent databases can include credit databases, government databases, public databases, etc. In this embodiment, the entity that is seeking to authenticate the individual communicates with the systems that are owned or managed by other entities.

In the case of a credit card transaction, the other entity might be a credit card transaction processing system. In this embodiment, the credit card transaction processing system might itself communicate with still another party that manages the database to obtain verification of authenticity. In a still further embodiment, the request for authentication information might itself come from the credit card processing system, rather than from the original entity with whom the individual seeks to communicate, receive a service from, or enter into a transaction with.

It is to also be understood that certain embodiments of the invention will be used in connection with the access code issuance system that is described in the beginning of this application. Other embodiments, however, will not be used in conjunction with that access code issuance system. The age verification that was earlier discussed will also be used with some embodiments, but again not with others. The topology shown in FIG. 1 is also a topology that will work well in connection with some embodiments of the invention, but, again, other embodiments will have a different topology. In a similar light, the process set forth in FIG. 2 will work well with some embodiments, but, again, will not be used with other embodiments.

It will be appreciated that the term "present invention" as used herein should not be construed to mean that only a single invention having a single essential element or group of elements is presented. Rather, each novel and nonobvious element constitutes a separate invention. Further, each novel and nonobvious combination of elements enabled by the present disclosure, whether the individual elements therein be old elements, new elements, or any combination thereof, further constitutes an additional separate invention.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

In the following claims, those claims which contain the words "means for" are intended to be interpreted in accordance with 35 U.S.C. § 112, paragraph 6; those claims which do not include the words "means for" are not intended to be interpreted in accordance with 35 U.S.C. § 112, paragraph 6.

I claim:

1. An authentication process for authenticating an individual having a social security number comprising:
   a) attempting to authenticate the individual with identification information supplied by the individual not in response to a request for any portion of that individual's social security number;
   b) comparing the information supplied by the individual not in response to a request for any portion of that individual's social security number with a database containing identification information about numerous persons; and
   c) if and only if there is not a unique match:
      electronically communicating to the individual a request to enter identification information into a computer about the individual, including certain specified digits of the individual's social security number, the certain specified digits being less than all of the digits of the individual's social security number;
      receiving from the individual identification information about the individual that the individual enters into the computer, including the certain specified digits of the individual's social security number;
      comparing the identification information entered by the individual, including the certain specified digits of the individual's social security number, but not the remaining digits of the individual's social security number, with a database containing identification information about numerous persons, including at least the certain specified digits of each person's respective social security number; and
      determining whether there is a match between the identification information entered by the individual, including the certain specified digits of the individual's social security number, but not the remaining digits of the individual's social security number, with the database containing identification information about numerous persons.

2. The process of claim 1 wherein the electronically communicating, the receiving and the comparing steps which are performed if and only if there is not a unique match are only performed if the comparing of the information not in response to a request for any portion of that individual's social security number does not clearly indicate that the authenticity of the individual is lacking.

3. An authentication system for authenticating an individual having a social security number comprising:
   a) a communication system configured to electronically communicate to the individual a first request to enter identification information into a computer that does not include any portion of a social security number and a second request to enter identification information into a computer that includes certain specified digits of the individual's social security number, the certain specified digits being less than all of the digits of the individual's social security number;

b) a receiving system configured to receive from the individual identification information about the individual that the individual enters into the computer in response to the first and the second request, including in response to the second request the certain specified digits of the individual's social security number;

c) a comparison system configured to compare the identification information entered by the individual in response to the first request with a database containing identification information about numerous persons and for determining whether there is a unique match and configured to compare the specified digits of the individual's social security number in response to the second request with a database containing identification information about numerous persons, including at least the certain specified digits of each person's respective social security number, and for determining whether there is a match;

d) a processing system configured to, if and only if there is not a unique match in connection with the identification information entered by the individual in response to the first request, cause:

the communicating system to issue the second request;

the receiving system to receive the certain specified digits of the individual's social security number, but not the remaining digits of the individual's social security number; and the comparison system to compare the identification information entered by the individual in response to the second request, including the certain specified digits, but not the remaining digits of the individual's social security number, with a database containing identification information about numerous persons and for determining whether there is a match.

4. The system of claim 3 wherein the processing system is configured to cause the communicating system, the receiving system and the comparison system to perform as recited in claim 3 only if the comparing of the information in response to the first request does not clearly indicate that the authenticity of the individual is lacking.

* * * * *